United States Patent [19]
Dole et al.

[11] Patent Number: 5,758,909
[45] Date of Patent: *Jun. 2, 1998

[54] ROTATION INHIBITING QUICK CONNECT CONNECTOR FOR GROOVED PIPE

[75] Inventors: Douglas R. Dole, Whitehouse Station, N.J.; Andrzej W. Domagala, Bethlehem, Pa.

[73] Assignee: Victaulic Company of America, Esaton, Pa.

[*] Notice: The term of this patent shall not extend beyond the expiration date of Pat. No. 5,498,042.

[21] Appl. No.: 665,480

[22] Filed: Jun. 18, 1996

[51] Int. Cl.$^6$ .................................. F16L 37/12
[52] U.S. Cl. .................. 285/305; 285/328; 285/330; 285/369; 411/353; 411/517; 24/17 A
[58] Field of Search .................. 285/305, 309, 285/321, 328, 329, 369, 330; 411/352, 353, 517, 518, 519; 403/359, 383, 22; 24/16 PB, 17 A, 483, 30.5 P

[56] References Cited

U.S. PATENT DOCUMENTS

| | | | |
|---|---|---|---|
| 4,537,427 | 8/1985 | Cooke | 285/305 |
| 5,040,831 | 8/1991 | Lewis | 285/305 |
| 5,498,042 | 3/1996 | Dole | 285/305 X |

FOREIGN PATENT DOCUMENTS 1030984  5/1966  United Kingdom .................. 285/305

*Primary Examiner*—Heather Shackelford
*Attorney, Agent, or Firm*—Abelman, Frayne & Schwab

[57] ABSTRACT

A quick connector for joining pipes having grooved ends has a circlip which is contracted circumferentially and locked in the contracted condition, the inner diameter of the circlip, when in the contracted condition, being less than the outer diameter of the pipe, the inner diameter of circlip and the bottom wall of the pipe groove including surface configurations that are interfitted in the contracted condition of the circlip, and which inhibit relative rotation between the quick connector and the pipe in addition to locking the connector against axial removable from the pipe.

7 Claims, 10 Drawing Sheets

ROTATION INHIBITING QUICK CONNECT CONNECTOR FOR GROOVED PIPE

FIELD OF THE INVENTION

This invention relates to a quick connect connector for a grooved pipe, which has the ability to inhibit rotation of the pipe relative to the connector, and, in turn, to inhibit rotation of a fitting relative to the grooved pipe, or, rotation of a further length of grooved pipe relative to the commencing length of grooved pipe.

By this invention, lengths of grooved pipe and appropriately grooved fittings can be secured to one another in a minimum of time, with a minimum of effort, and, by a workman having minimal skill.

Grooved pipe is well-known in the art, and is comprised of a length of metal or plastics pipe which has been cut or roll grooved in its outer circumference at a position adjacent an end of the pipe, to provide an annular groove extending circumferentially of the pipe.

The connector of the present invention finds utility in the joining of two lengths of grooved pipe in end-to-end relation, or, in connecting a grooved pipe to a fitting or fixture that also has been appropriately grooved for it to simulate an end of a grooved pipe.

The connector itself can be an axially straight connector for connecting two lengths of grooved pipe in end-to-end relation, or, it can be in the form of an elbow for connecting two lengths of grooved pipe in end-to-end right angled relation, or, it can be in the form of a T or cross adapted to connect multiple lengths of grooved pipe to a supply main of grooved pipe, or, it can be in the form of an adapter for receiving a sprinkler head, tap, pressure gauge, or other fitting.

While in its simplest form, the connector is in the form of a tube of substantially constant diameter throughout its length, the connector can be appropriately configured for it to connect a grooved pipe of one diameter to one or more grooved pipes of a different diameter.

The connector of the present invention finds particular utility in the quick assembly of water supply lines for non-permanent municipal, armed forces, refugee and other camp grounds, for use in field hospitals, field kitchens, showers, and the like, in which the supply lines must be assembled with minimum time and effort, and, similarly disassembled with minimum time and effort for transportation and re-assembly at a different site.

The connector of the present invention also finds particular utility in the quick assembly of water supply lines in mining operations, and in particular coal mines, in which the terrain to be traversed progressively is changed as the mining operation proceeds. Also, in such operations, it is required that the pipe lines must accommodate themselves to uneven terrain, slopes and angles and bends, that occur randomly as the mining corridors are developed.

The quick connector also evidences utility in the assembly of horticultural irrigation systems, that will be disassembled after a growing season to permit preparation of the ground for a subsequent growing season.

Such horticultural irrigation systems commonly are comprised of a main supply pipe line which is connected to secondary distribution pipe lines, the distribution pipe lines being employed to feed spray nozzles and the like, or, perforate drip irrigation lines.

BACKGROUND OF THE INVENTION

Quick connectors for pipe lines are well-known in the art, and, commonly are employed for connecting lengths of horticultural flexible plastic hose to one another.

Additionally, numerous devices have been prior proposed that are received in clamping engagement with the ends of un-grooved or plain-ended pipe, such devices commonly employing band clamps which are employed to compress a sleeve of a resilient material, such as rubber, into frictional gripping and sealing relation with the outer surface of plain-ended pipe.

Such installations are relatively weak and insubstantial, in that they rely exclusively on the frictional gripping of the pipes by the connecting sleeve, and, are subject to separation and water loss in the event that one of the pipes is angled relative to the other, or, is subjected to a tensile stress. Typical of such clamp-type connectors are those disclosed in U.S. Pat. No. 3,586,354 to Boscacci, and 5,193,859 to McKinnon.

More substantial types of connectors are disclosed in U.S. Pat. No. 2,980,143 to Harris, 4,146,252 to Bunda and 4,630,647 to Thompson, each of which is cumbersome and laborious to assemble, and each of which requires a wrench or other tool for its assembly.

These problems have been previously given consideration, and have been successfully met by the teachings of U.S. Pat. No. 5,498,042, issued Mar. 12, 1996 in the name of Douglas R. Dole, and assigned to the common Assignee.

U.S. Pat. No. 5,498,042 discloses and claims a quick connect connector for grooved pipe that will facilitate the quick assembly of pipe lines employing grooved pipe, with extreme rapidity, and in the absence of tools, and, which will provide a pipe line assembly having substantial strength and resistance against axial, lateral, or bending stressing of the pipes, thus to provide a predictability stable and leak-proof pipe line assembly, which, when required, can be disassembled with equal speed and facility, again, in the absence of tools.

Those advantages are accomplished by providing a connector in the form of a hollow cylinder that is sized for it to be slid easily over the end of a grooved pipe, the connector providing a housing for an O-ring for sealing engagement with the outer surface of the grooved pipe. Preferably, the O-ring is positioned within the connector at a location in which it is not required to pass over the cut or rolled groove in the pipe, thereby minimizing the chances of cutting or abrasion of the O-ring during the assembly of the coupling onto the pipe.

Preferably, the coupling includes an internal abutment for engagement with the end of the grooved pipe, in order that the connector can be quickly positioned over the grooved pipe in a required positional relationship relative to the grooved pipe, by merely stabbing the coupling onto the pipe end, or conversely, stabbing the pipe end into the coupling.

Interiorly of the coupling, there is provided an annular groove, which opens circumferentially into an access port which extends radially through the coupling, and which is open at the radially outer side of the coupling.

Positioned within the groove is a circlip, which can be manually contracted and locked in a condition in which the diameter of its inner periphery is less than the outer diameter of the pipe, and its outer periphery is of a diameter greater than the outer diameter of the pipe, and also greater than the inner diameter of the coupling. This provides a positive abutment for the side walls of the groove in the pipe, and also the side walls of the annular groove in the coupling member, thus to preclude unrestrained relative axial movement between the and the coupling member.

When it is desired to disassemble the pipe line, the locking device of the circlip is manually released, this permitting the circlip to expand to a larger diameter in which the circlip is contained entirely within the groove in the coupling the inner diameter of the circlip having been expanded to a diameter greater than the outer diameter of the pipe and greater than the inner diameter of the coupling, in this way removing the circlip in its entirety in its capacity of providing an abutment for the side wall of the groove in the pipe, and, permitting easy removal of the coupling from the pipe, or vice versa.

The grooved pipe can be cut-grooved metal or plastics pipe, or, it can be roll-grooved plastics pipe or thin-walled metal pipe. The coupling member can be formed of any suitable material including metals and plastics materials that are of sufficient rigidity to resist bending of the coupling member out of axial linearity. The circlip conveniently is formed from a hard but resilient plastics material, but also, if desired, could be fabricated from a suitable metal.

While the quick connect coupling of the issued patent performs admirably in its capability of enabling rapid assembly of pipe lines and fixtures, and the subsequent rapid disassembly of such pipe lines and fixtures, it is encumbered with a disadvantage, that is overcome by the teachings of the present invention.

In particular, while the prior art coupling is imminently successful in preventing separation of the pipes under axial and bending loadings, it does not necessarily inhibit rotation of one of the pipes relative to the next connecting pipe, or, rotation of a fitting that has been connected to an end of a pipe or between adjacent ends of pipes.

SUMMARY OF THE INVENTION

It is an object of this invention to eliminate the disadvantage appearing in the disclosure of U.S. Pat. No. 5,498,042 of permitting relative rotation between the pipe and the coupling, or, such angular rotation of a fitting attached to the coupling.

According to the present invention, the inner circumference of the circlip is provided with axially-extending serrations, and similarly the groove provided in the pipe end or in the fitting is provided with complementary axially extending serrations.

Thus, upon contraction and locking of the circlip, the respective axially-extending serrations are inter-engaged and interfit, thus inhibiting rotational movement of the circlip relative to the pipe or fitting.

The circlip is located within the connector in a manner inhibiting angular or rotational movement of the circlip within the connector by providing an abutment on the radially outer circumference of the circlip that is entrapped within a corresponding radially extending aperture in the connector.

The abutment can be a radially extending abutment located at a position intermediate the ends of the circlip, or, it can be provided on one end of the circlip, in this manner permitting the circumferential contraction of the circlip, while at the same time inhibiting the relative rotation between the circlip and the connector, and, ultimately, when the circlip is contracted into securing engagement in the pipe groove with the respective serrations inter-engaged, then inhibiting relative rotation between the connector and the pipe or fitting.

The interference in locking engagement of the circlip within the groove of the pipe or fitting and the elimination of relative rotational movements of the pipe, connector, or fitting, permits the rapid assembly and disassembly of rigid pipelines, and the rigid attachment of fittings to the rigid pipeline.

The axially-extending serrations in the groove of the pipe or fitting readily can be provided by means of a rolling operation by the use of an axially serrated pressure roll, which can be either be at ambient temperature for roll grooving the serrations in metal pipe or in pipe formed from plastics materials that are conducive to cold rolling, or, in the event that the plastics material is a heat deformable material, then, the pressure roll can be heated to an appropriate temperature prior to effecting the serrating operation.

The serrations on the inner circumference of the circlip readily can be provided during the molding of the circlips, or, can be effected by a broaching or stamping operation.

DESCRIPTION OF THE DRAWINGS

Preferred embodiments of the invention will now be described with reference to the accompanying drawing, in which.

DESCRIPTION OF THE PRIOR ART

Figure 1:
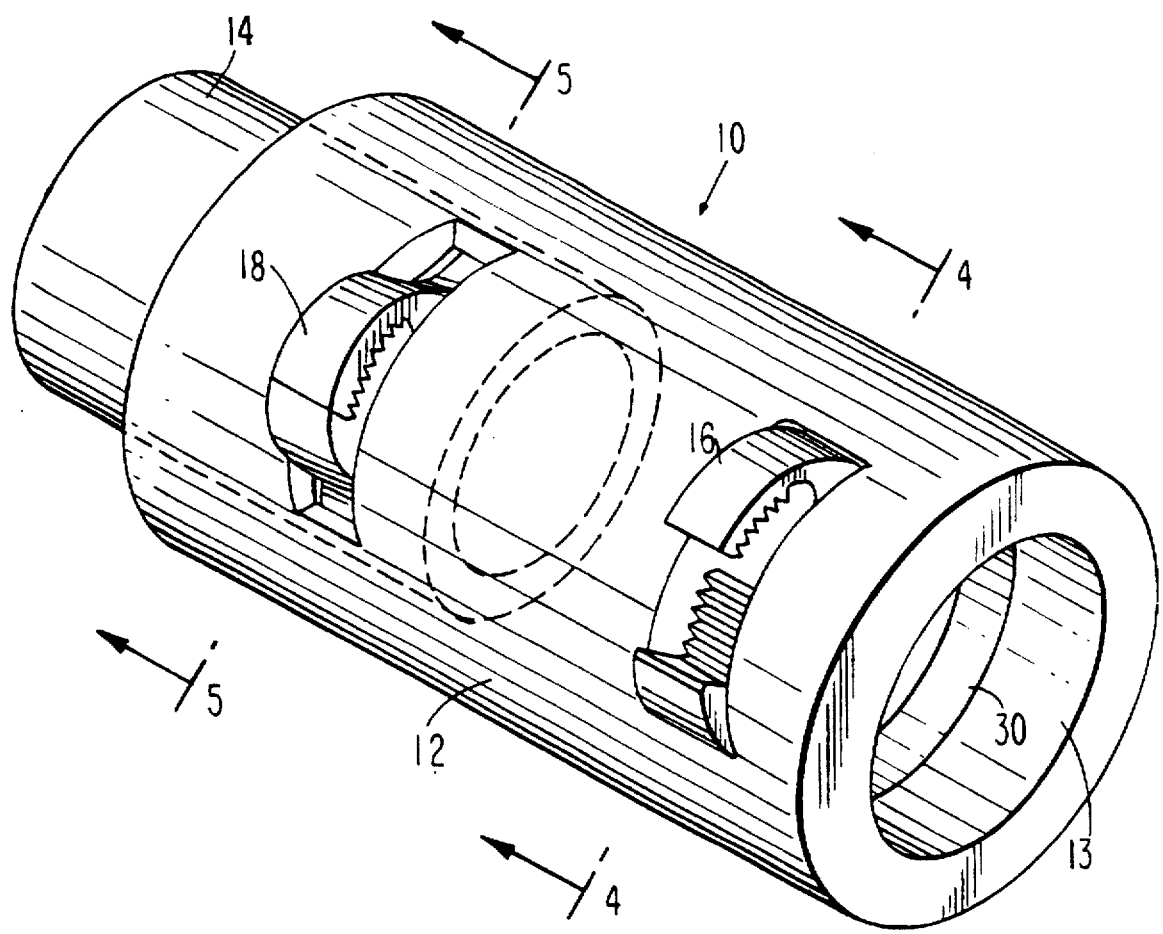
FIG. 1 is a perspective view of a prior art basic form of connector to be employed in joining to lengths of grooved pipe to each other in axial alignment.

FIG. 1 illustrates a basic form of connector according to the prior art, which is specifically intended to connect the axially aligned ends of two grooved pipes.

The connector, which is indicated generally at 10, comprises a cylindrical body 12 having a central bore 13, for the reception of the pipe ends, one of which is shown at 14.

Located within the body 12, as later fully described, are two circlips 16 and 18, the circlip 16 being shown in an open position in readiness for the reception of a pipe end, the circlip 18 being shown in a closed and secured position in which it is operative to prohibit removal of the connector 10 from the pipe 14, or, in the alternative, removal of the pipe 14 from the connector 10.

Figure 2:
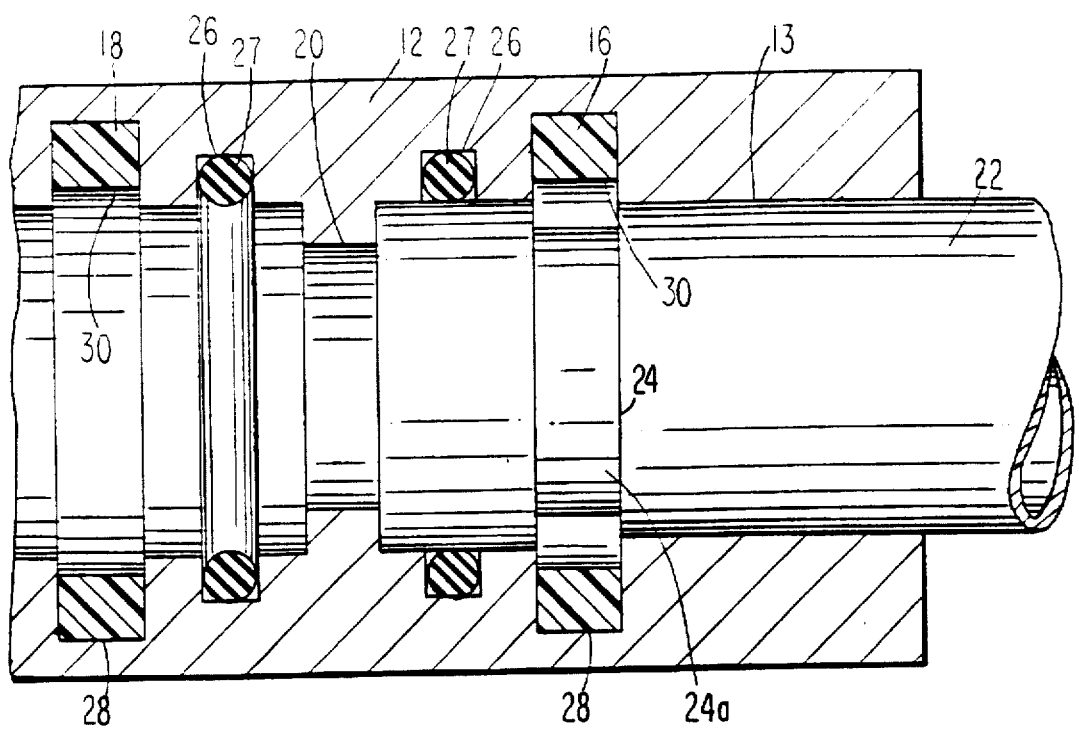
FIG. 2 is a longitudinal cross-section to the prior art connector showing the connector in an unlocked condition.
Figure 3:
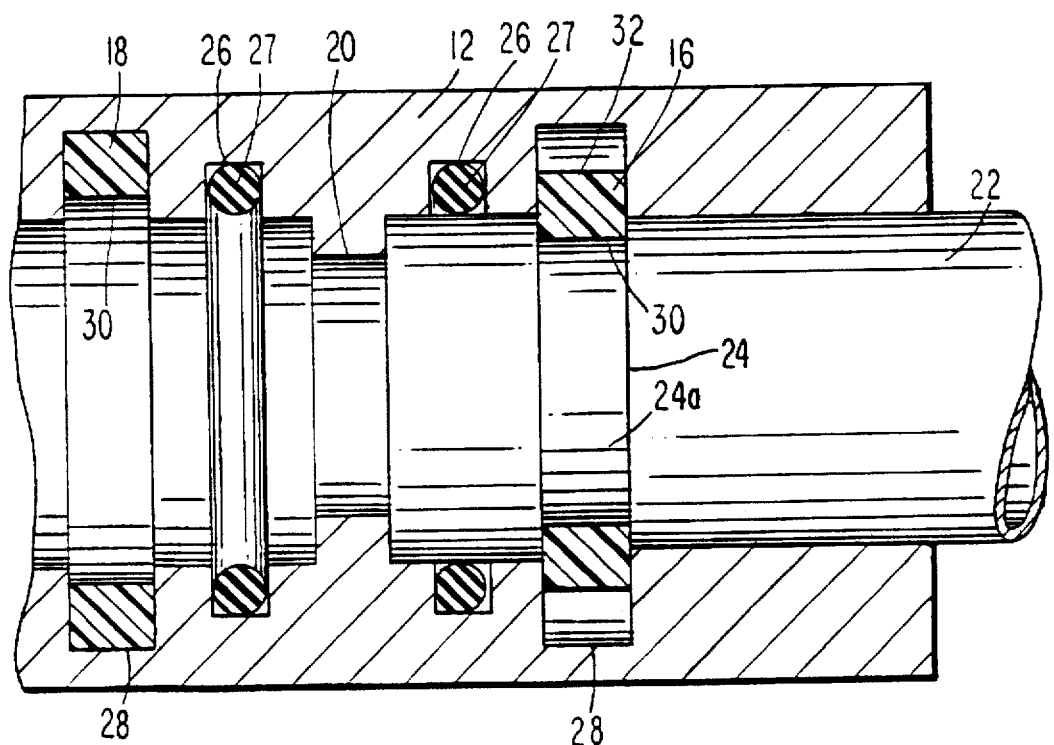
FIG. 3 is a longitudinal cross-section to the prior art connector similar to that shown in FIG. 2, but showing the connector in locked condition.

Referring now to FIGS. 2 and 3, the cylindrical body 12 is provided with a central abutment 20, which is provided to limit the extent to which a grooved pipe 22 can be inserted into the central bore 13 of the body, in this way accurately positioning the groove 24 in the pipe periphery in correct relation to the juxtaposed circlip 16 or 18.

In FIG. 2, both of the circlips 16 and 18 are shown in an expanded condition in which an inner periphery 30 of the respective circlips 16 and 18 are of a diameter at least equal to, and preferably slightly greater than the diameter of the pipe 22. In this condition, the pipe 22 can be stabbed into the body 12, or in the alternative, the body 12 can be stabbed onto the pipe 22, to bring the free end of the pipe 22 into contact with the abutment 20.

The circlip 16 is then contracted in diameter as shown in FIG. 3 for its inner diameter 30 to become less than the outer diameter of the pipe 22, the outer periphery 32 of the circlip 16 being of a diameter greater than the outer diameter of the pipe 22. In this condition, and as shown in FIG. 3, the end walls of the circlip 16 provide a positive abutment for the side walls of the groove 24 of the pipe 22, and also provides positive abutments for the side walls of the annular groove 28.

The pipe 22 is in this manner locked against axial movement relative to the body 12, the O-ring 27 providing a liquid-tight seal between the end of the pipe 22 and the body 12.

A second pipe (not shown) can then be stabbed into the opposite end of the connector in an identical manner to the pipe 22, subsequent to which the circlip 18 is contracted in an identical manner to the circlip 16 for it to secure that pipe within the body in an identical manner to that described with reference to the pipe 22.

At that point, the two pipes become locked within the body 12 in axial alignment with each other, leakage being prevented by the respective O-rings 27, which are located in grooves 26 formed in the body 12.

In the prior art constructions, the bottom wall 24a of the groove 24 cut into the exterior of the pipe 22 is cylindrical and axially straight.

Thus, and as is illustrated in FIG. 3, at the time the circlip 16 is contracted into the groove 24, while the circlip 30 is operative to inhibit relative axial movement between the connector 12 and the pipe 22, it cannot inhibit relative rotation between the connector 12 and the pipe 22. All that will occur, and this assumes that circlip has been contracted into clamping engagement with the bottom wall 24a of the groove 24, is that a minor frictional restraint will be provided acting against such rotational movement between the connector 12 and the pipe 22.

In the prior art arrangement, a locking device is provided for locking the circlip in the contracted position, and, which is releasable to enable the circlip to return to return under its own inherent memory to its original expanded condition.

The locking device is comprised by interfitting members provided at the respect ends of the circlip, and which include a locking member 34 which is received within a locking member 36 provided at the opposite end of the circlip 16 or 18.

The locking member 34 is arcuate in form and is provided with serrated teeth 38 on its outer surface. The complementary locking member 36 is provided with arcuate extensions 40 and 42, the arcuate extension 42 being provided with serrated teeth 44 on its inner arcuate surface.

Figure 5:
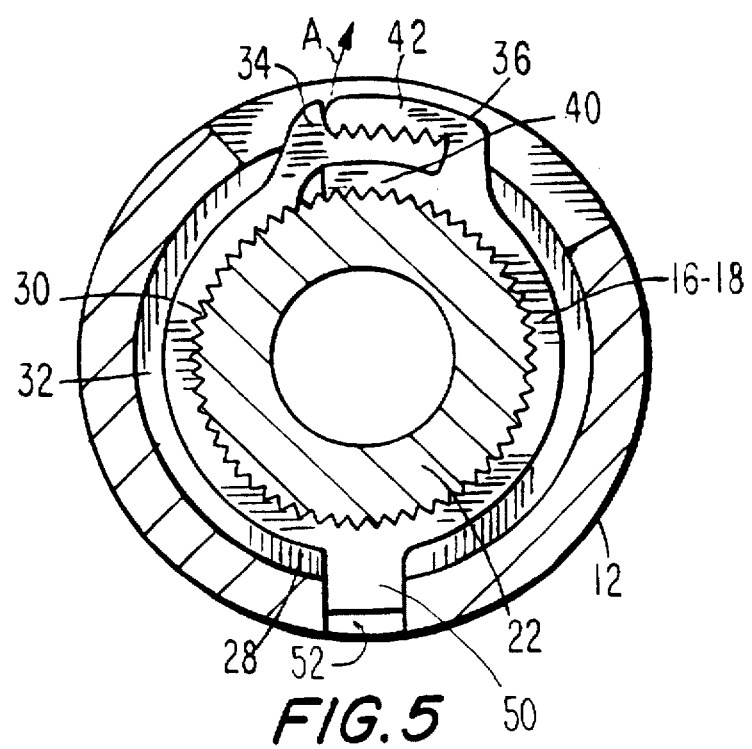
FIG. 5 is a transverse cross-section along the line V—V in FIG. 1, and showing a connector according to the present invention when in a locked condition.
Figure 6:
FIG. 6–11 illustrate diagrammatically various configurations that the connector may provide in order to meet varying requirements in a piping system.

The respective locking member 34 and 36 extend radially outwardly of an access port 46 that interconnects with an associated annular groove 28, such that the locking members 34 and 36 can be gripped exteriorly of the body 12, and then, be moved towards each other and interlocked with each other as illustrated in FIG. 5.

When moved towards each other to the position shown in FIG. 5, the locking member 34 enters the arcuate extensions 40 and 42 of the locking member 36 for the locking member 34 to be entrapped within and securely held by the arcuate extensions 40 and 42 of the locking member 36, movement of the arcuate extension 42 being permitted by resilience of the circlip 16 or 18, the circlips being formed from a relatively hard but resilient plastics material, or of a spring metal material.

Figure 4:
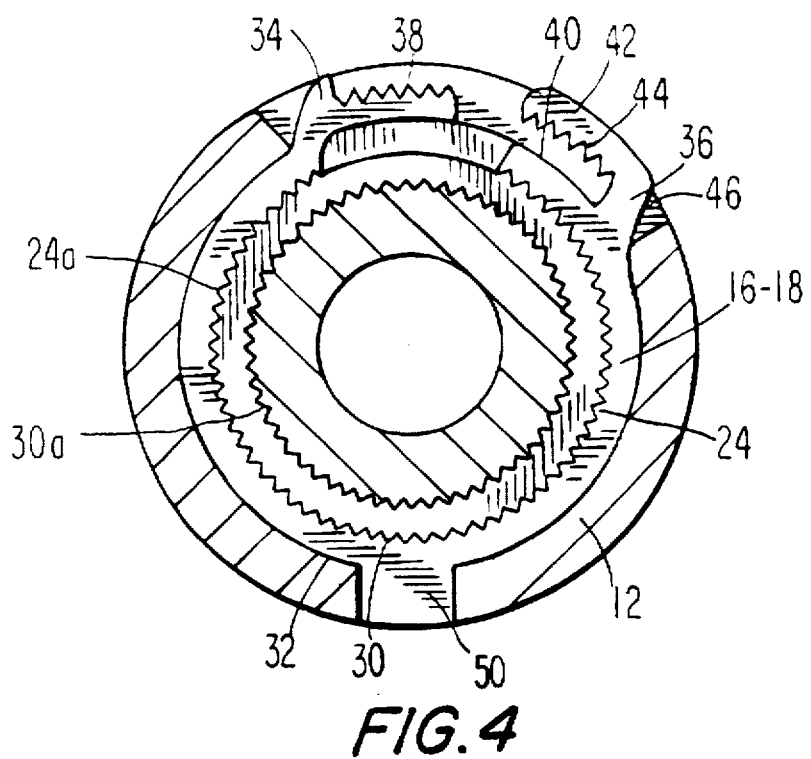
FIG. 4 is a transverse cross-section taken on the line IV—IV in FIG. 1, showing a connector according to the present invention when in an unlocked condition.

During that movement the circlip becomes contracted in diameter, such that inner periphery of the circlip, which initially was of a diameter greater than that of the pipe 22 becomes of lesser diameter than the pipe 22, and is moved radially inwardly of the groove 24 from the position shown in FIG. 4 to the position shown in FIG. 5.

The outer diameter of the circlips similarly decreases, the radial width of the respective circlips being such that in the contracted position shown in FIG. 5, the outer diameter 32 of the circlip remains entrapped within the annular groove 28, the diameter of the outer periphery of the circlip in that condition being greater than the diameter of the pipe 22.

DESCRIPTION OF THE INVENTION

In contra-distinction to the prior art construction in which the radially periphery of the circlip 16 or 18 is smoothly continuous, and, the bottom wall of the groove 24 is smooth and uninterrupted, such as will permit rotation of the sleeve and pipe relative to each other, according to the present invention, the inner diameter 30 of the circlips 16 and 18 is provided with axially extending serrations 30A, and, the bottom wall of the pipe groove 24 is provided with complementary axially extending serrations.

Thus, in the released condition of the circlip 16 or 18, relative rotation between the connector and the pipe is readily available, to enable the seating of the pipe end within the connector, subsequent to which the circlip 16 or 18 is then contracted and locked in the contracted condition with the serrations of the circlip and those of the bottom wall of the pipe groove interfitted, in this manner prohibiting relative rotation between the circlip 16 or 18 and the associated pipe 22.

In order to eliminate relative rotation between the circlip and the connector, the circlip 16 or 18 is provided with a radially extending projection 50, which is a slidable fit within an aperture 52 formed in the body in the connector 12, and which intersects the groove 28 formed in the body of the connector.

Figure 7:
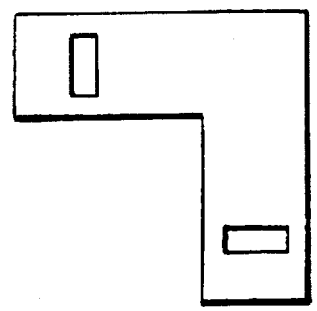
Figure 8:
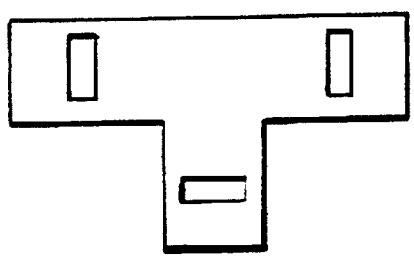
Figure 9:
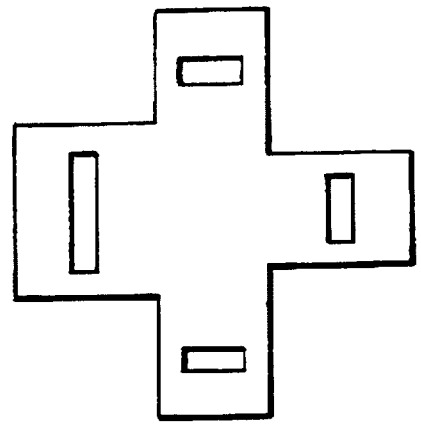
Figure 10:
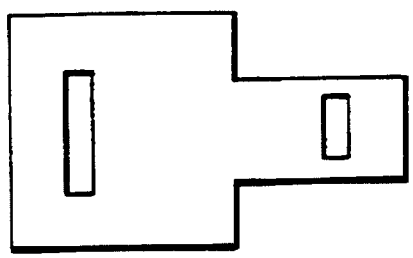
Figure 11:
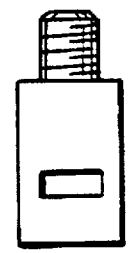

While a straight line connector so for has been described, as will be apparent from FIGS. 6–11 the connector can take a multitude of forms. For example, the basic in-line connector of FIG. 6 can be provided as an elbow, as illustrated in FIG. 7, or as a T, as illustrated in FIG. 8, or, as a cross, as illustrated in FIG. 9. FIG. 9 also illustrating the option of one arm of the connector being formed to accommodate a pipe of larger diameter than the pipes accommodated by other arms of the connector. Similarly, as illustrated in FIG. 10, the connector can provide a step-down between a pipe of large diameter and a pipe of smaller diameter. As illustrated in FIG. 11, the connector can provided a termination of pipeline, which conveniently can have a tap, shower head, sprinkler head, or similar device attached thereto, thus facilitating the construction of washing facilities, showers, irrigation systems and the like of any desired lay-out and configuration.

By virtue of the rigid interconnection of the connector and the associated pipe or fitting, an entirely rigid pipeline assembly can be assembled, the fittings incorporated into the pipeline assembly themselves being settable at any desired angle, and, upon locking down of the connector being held immovably in that selected position.

Figure 12:
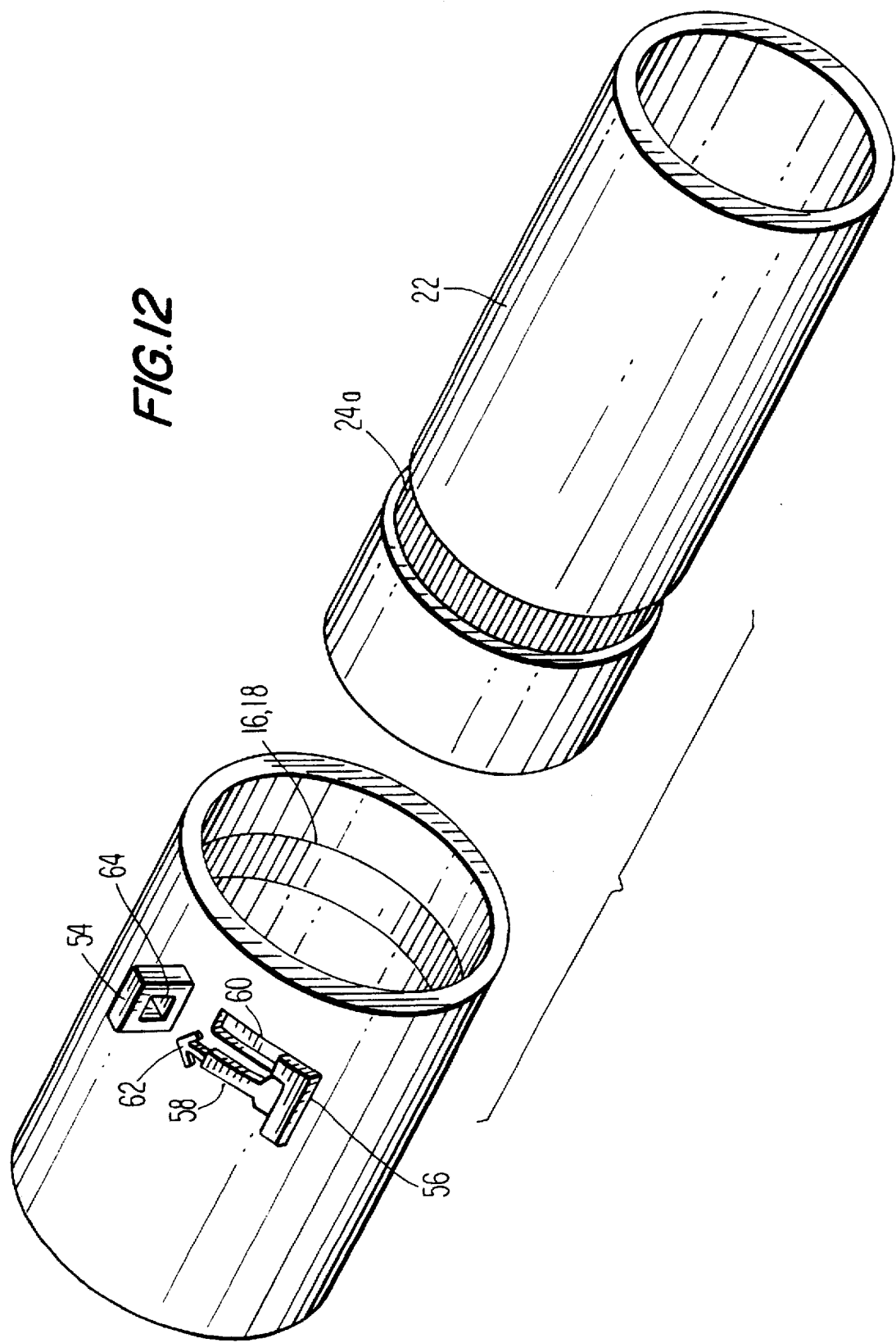
FIG. 12 is a perspective view of an alternative form of connector according to the present invention when in an unlocked condition.
Figure 13:
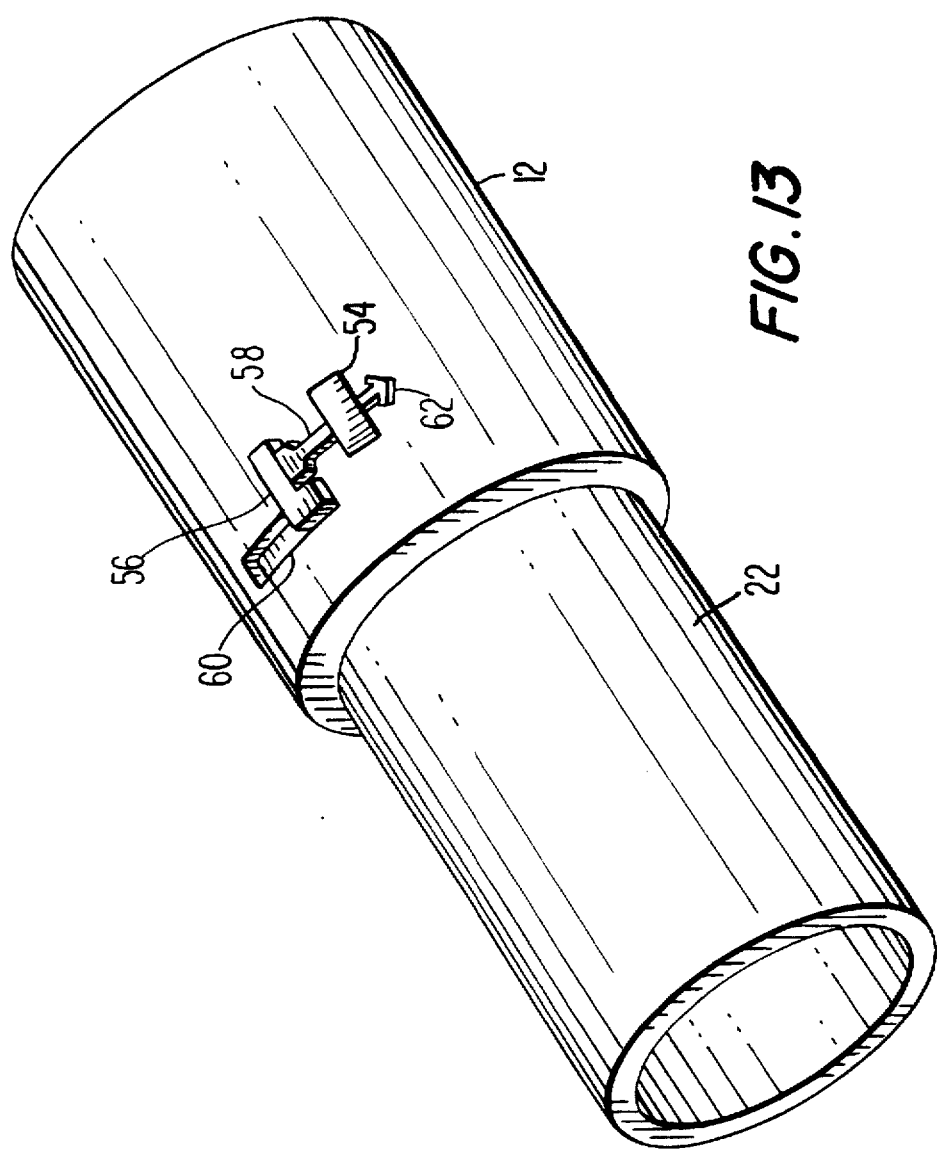
FIG. 13 is a perspective view showing the connector of FIG. 12 when in a locked condition.

An alternative construction of the body of the connector and the circlip is illustrated in FIGS. 12 and 13.

In this alternative embodiment, one end of the circlip 16 or 18 is provided with a radial projection 54, which extends through an aperture in the body 12, and is held captive therein.

The opposite end of the circlip is provided with a radial projection 56, which carries a locking member 58, and which is slidable circumferentially of the pipe within a circumferential slot 60, thus to permit locking of the circlip in a contracted condition by moving the projection 54 in a direction circumferentially of the connector 12, to insert a latch member 62 of the locking member 58 through an aperture 64 provided in the radial extension 54.

As will be readily apparent to persons skilled in the art, various other configurations of locking members can be employed in conjunction with the circlip, that are operative to latch the circlip in a contracted condition, and, which are releasable to permit expansion of the circlip to its original condition at the time it is desired to disassemble the pipeline assembly.

As also will be readily apparent, various other configurations of pipe groove circlip are possible, that will accomplish the basic object of the present invention, which is that of preventing rotation of the pipe relative to the coupling when the circlip is in a locked position.

Examples of such alternatives constructions are now discussed with respect to FIGS. 14–20.

Figure 14:
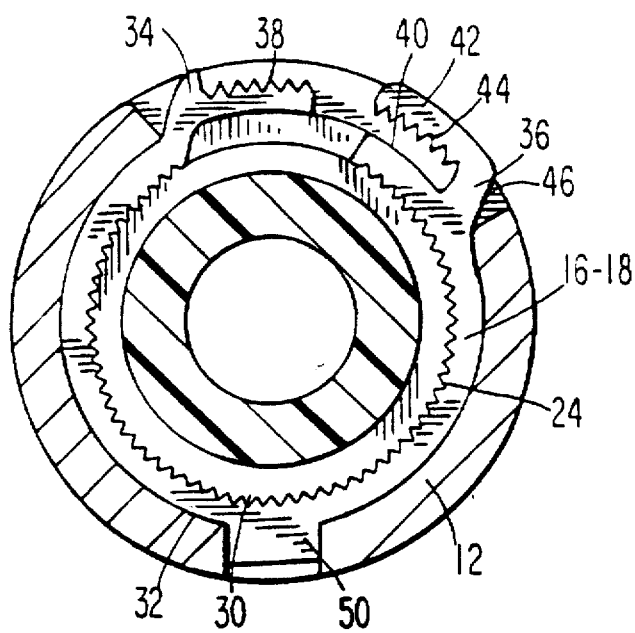
FIG. 14 is a view corresponding with FIG. 4, but showing an alternative construction of the connector.

Referring now to FIG. 14, in the event that the coupling is to be employed with pipes formed of plastics material, the circlip 16–18 can be formed of a material considerably harder than the material from which the pipes are formed so that the teeth on the circlip can become embedded in the bottom wall of the pipe groove upon closure of the circlip. In this event, the need to provide serrations on the bottom wall of the pipe groove is eliminated.

Figure 21:
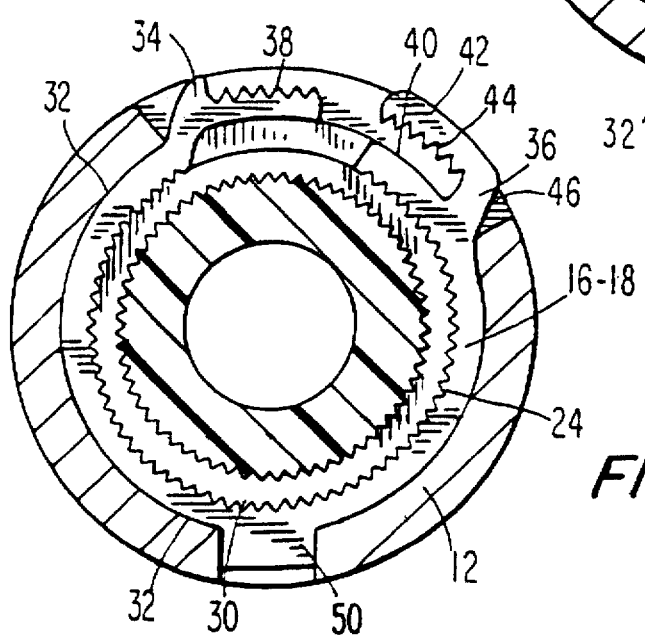
FIGS. 15, 16 and 21 are views corresponding with FIGS. 2 and 3, when modified to incorporate the teachings of the present invention.
Figure 15:
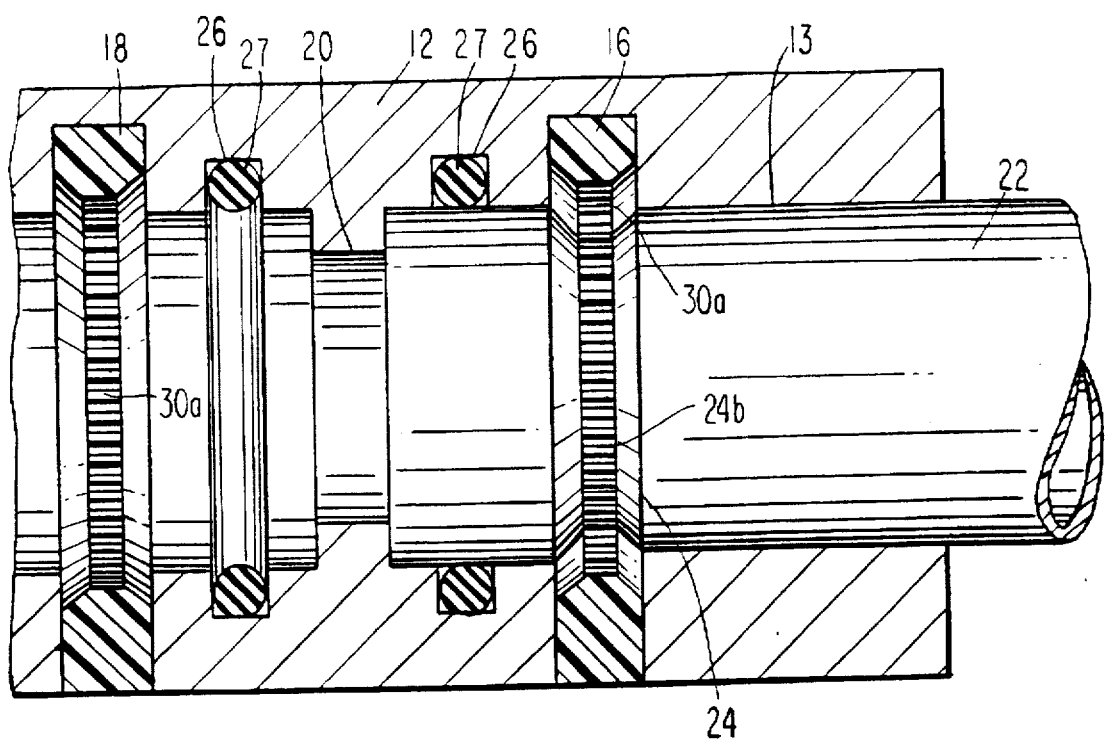
Figure 16:
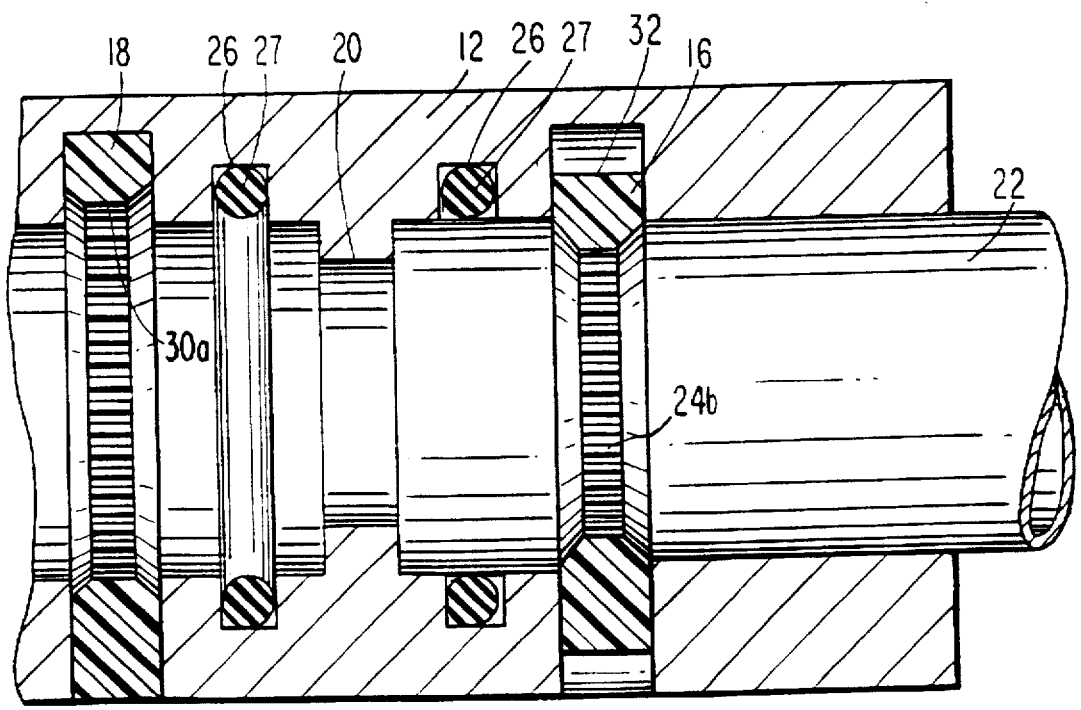
Figure 17:
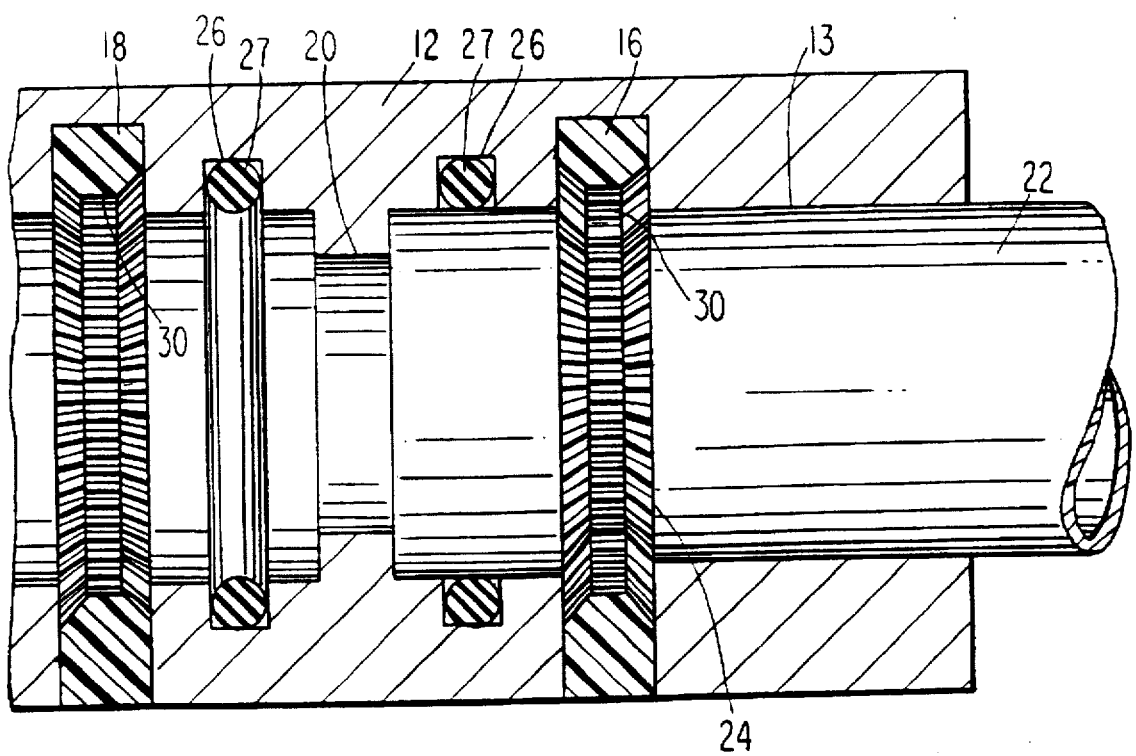
FIG. 17 is a view corresponding with FIG. 15, and illustrating a further embodiment of the invention.

FIGS. 15 and 16 illustrate a further alternative, in which the groove 24b in the pipe wall is trapesoidal and formed with sloping side walls, and, the inner periphery of circlip 16 or 18 is correspondingly configured, the side walls of the circlip and the engaged side walls of the groove acting as further frictional restraint against relative movement between the pipe 22 and the coupling 12. In FIGS. 15 and 16 the bottom wall of the groove can be serrated, as previously described with reference to FIGS. 4 and 5, and, as illustrated in FIG. 17, the side walls of the groove also can be serrated, as can the side walls of inner periphery of the circlip, thus to provide a positive locking interengagement between the side walls of the groove and the side walls the clip, which, when the clip is locked, provides a further positive engagement between the clip and the pipe groove, to further inhibit relative rotation between the pipe and the coupling. FIG. 21 further illustrates the trapezoidal radial cross-section of the circlip and the pipe groove.

Figure 18:
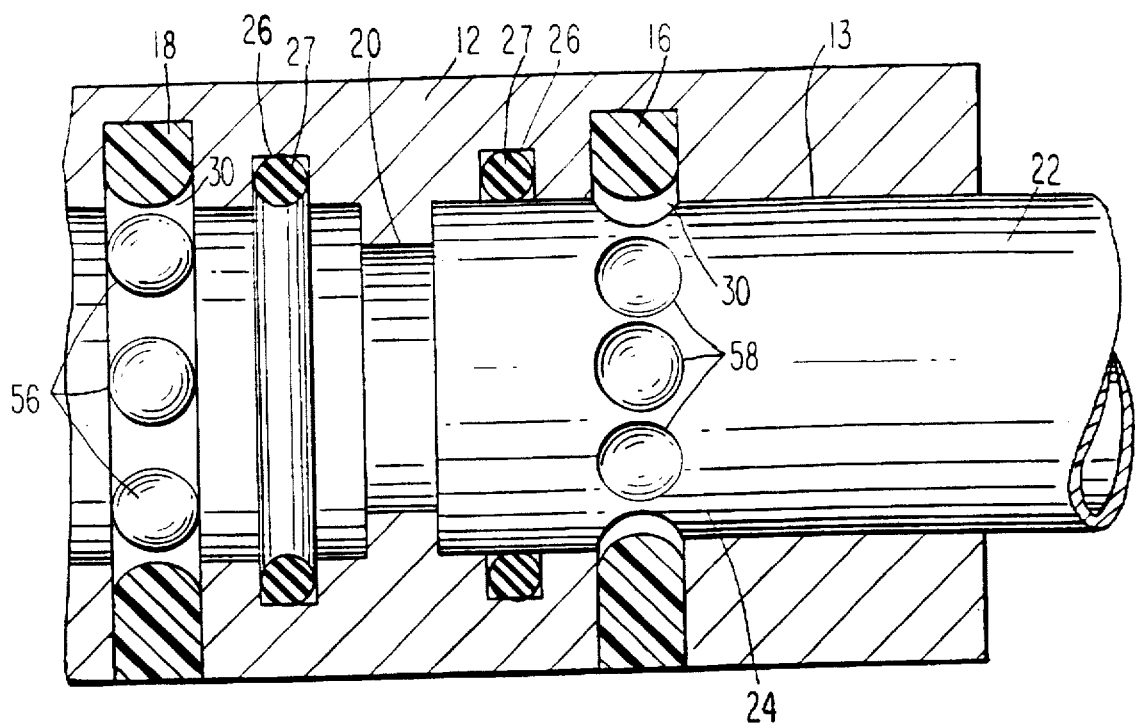
FIGS. 18 and 19 are views corresponding with FIGS. 15 and 16 and showing a still further embodiment of the present invention.
Figure 19:
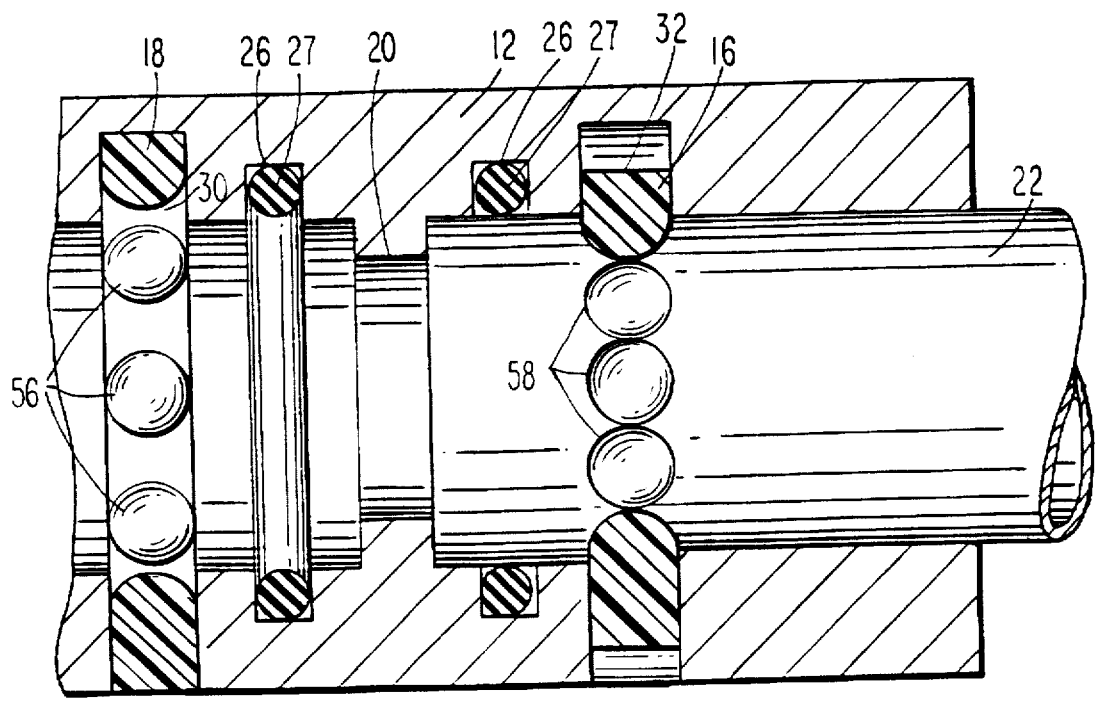

Other configurations interengageable surfaces can be employed to in order to inhibit relative rotation between the pipe and the coupling. For example, and as shown in FIGS. 18 and 19, the inner periphery of the circlip 16–18 can be formed with semi-spherical projections 56 that are receivable within semi-sperical indentations 58 that have been formed in the outer circumference of the pipe, the main objective being that projections are provided on the inner circumference of the circlip that will interfit with corresponding recesses formed in the outer periphery of the pipe, this including the formation of the inner circumference of the circlip as a regular polygon, and, the forming the groove in the outer periphery of the pipe as a complimentary polygon, as illustrated in FIG. 20.

Figure 20:
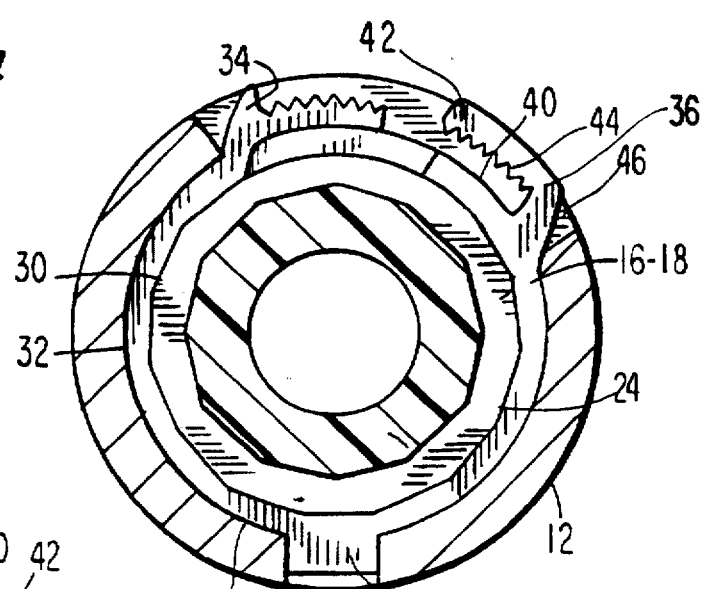
FIG. 20 illustrates a further alternative embodiment of the present invention.

In the event that the circlip and pipe groove are configured as illustrated in FIG. 20, a minor initial rotation of the pipe will be required as the circlip is closed, in the event that closure of the circlip does not itself automatically produce that rotation.

What is claimed is:

1. In a quick connector for a circular pipe of a specific outer diameter having a circumferential groove in an outer surface of said pipe, positioned adjacent an axial end of said pipe and spaced from said axial end, said connector including:

a body having a cylindrical bore, said body having an axial length sufficient to engage said pipe on opposite sides of said circumferential groove of said pipe, said bore having a diameter adapted to slightly exceed that of said outer diameter of said pipe;

a first annular groove having a bottom wall and opposing side walls in said body encircling said bore and communicating directly with said bore at a position adapted to be aligned with said groove of said pipe when said pipe is inserted into said bore of said body;

an abutment within said bore for limiting the extent of axial insertion of said pipe into said bore and for axially aligning said groove in said pipe with said first annular groove in said bore;

a circlip positioned within said first annular groove in said body, said circlip having end walls engaging said opposing side walls of said annular groove, and having an inner diameter at least equal to the diameter of said bore, and having an outer diameter substantially greater than the diameter of said bore; and means for contracting and locking said circlip into said circumferential groove to an inner diameter less than said outer diameter of said pipe and an outer diameter greater than said diameter of said bore;

whereby, said circlip provides a stop member for prohibiting removal of said pipe from said connector when said circlip is in a contracted and locked condition;

further including a second annular groove in said body encircling said bore at a position along said cylindrical bore at a position remote from said first annular groove; and an O-ring positioned in said second annular groove and engageable with said pipe outer surface in sealing engagement therewith when said pipe is inserted into said bore of said body;

and further comprising;

said inner diameter of said circlip including a surface having circumferentially spaced axially extending projections which are adapted to extend toward and engage said pipe groove in rotating inhibiting surface contact with said pipe groove when said circlip is in said contracted condition.

2. In a quick connector for a circular pipe of a specific outer diameter having a circumferential groove in an outer surface of said pipe, positioned adjacent an axial end of said pipe and spaced from said axial end, said connector including:

- a body having a cylindrical bore, said body having an axial length sufficient to engage said pipe on opposite sides of said circumferential groove of said pipe, said bore having a diameter adapted to slightly exceed that of said outer diameter of said pipe;
- a first annular groove having a bottom wall and opposing side walls in said body encircling said bore and communicating directly with said bore at a position adapted to be aligned with said groove of said pipe when said pipe is inserted into said bore of said body;
- an abutment within said bore for limiting the extent of axial insertion of said pipe into said bore and for axially aligning said groove in said pipe with said first annular groove in said bore;
- a circlip positioned within said first annular groove in said body, said circlip having end walls engaging said opposing side walls of said annular groove, and having an inner diameter at least equal to the diameter of said bore, and having an outer diameter substantially greater than the diameter of said bore; and
- means for contracting and locking said circlip into said circumferential groove to an inner diameter less than said outer diameter of said pipe and an outer diameter greater than said diameter of said bore;
- whereby, said circlip provides a stop member for prohibiting removal of said pipe from said connector when said circlip is in a contracted and locked condition;
- further including a second annular groove in said body encircling said bore at a position along said cylindrical bore at a position remote from said first annular groove; and
- an O-ring positioned in said second annular groove and engageable with said pipe outer surface in sealing engagement therewith when said pipe is inserted into said bore of said body;

and further comprising;

said inner diameter of said circlip having rotation inhibiting surfaces adapted to provide rotation inhibiting surface contact with said pipe groove when said circlip is in said contracted condition;

wherein said rotation inhibiting surfaces on said circlip are comprised of axially extending serrations.

3. In a quick connector for a circular pipe of a specific outer diameter having a circumferential groove in an outer surface of said pipe, positioned adjacent an axial end of said pipe and spaced from said axial end, said connector including:

- a body having a cylindrical bore, said body having an axial length sufficient to engage said pipe on opposite sides of said circumferential groove of said pipe, said bore having a diameter adapted to slightly exceed that of said outer diameter of said pipe;
- a first annular groove having a bottom wall and opposing side walls in said body encircling said bore and communicating directly with said bore at a position adapted to be aligned with said groove of said pipe when said pipe is inserted into said bore of said body;
- an abutment within said bore for limiting the extent of axial insertion of said pipe into said bore and for axially aligning said groove in said pipe with said first annular groove in said bore;
- a circlip positioned within said first annular groove in said body, said circlip having end walls engaging said opposing side walls of said annular groove, and having an inner diameter at least equal to the diameter of said bore, and having an outer diameter substantially greater than the diameter of said bore; and
- means for contracting and locking said circlip into said circumferential groove to an inner diameter less than said outer diameter of said pipe and an outer diameter greater than said diameter of said bore;
- whereby, said circlip provides a stop member for prohibiting removal of said pipe from said connector when said circlip is in a contracted and locked condition;
- further including a second annular groove in said body encircling said bore at a position along said cylindrical bore at a position remote from said first annular groove; and
- an O-ring positioned in said second annular groove and engageable with said pipe outer surface in sealing engagement therewith when said pipe is inserted into said bore of said body;

and further comprising;

said inner diameter of said circlip having rotation inhibiting surfaces adapted to provide rotation inhibiting surface contact with said pipe groove when said circlip is in said contracted condition;

and said rotation inhibiting surfaces comprise axially extending serrations which are adapted to mate with complementary axially directed serrations on a bottom wall of said circumferential groove of said pipe.

4. In a quick connector for a circular pipe of a specific outer diameter having a circumferential groove in an outer surface of said pipe, positioned adjacent an axial end of said pipe and spaced from said axial end, said connector including:

- a body having a cylindrical bore, said body having an axial length sufficient to engage said pipe on opposite sides of said circumferential groove of said pipe, said bore having a diameter adapted to slightly exceed that of said outer diameter of said pipe;
- a first annular groove having a bottom wall and opposing side walls in said body encircling said bore and communicating directly with said bore at a position adapted to be aligned with said groove of said pipe when said pipe is inserted into said bore of said body;
- an abutment within said bore for limiting the extent of axial insertion of said pipe into said bore and for axially aligning said groove in said pipe with said first annular groove in said bore;
- a circlip positioned within said first annular groove in said body, said circlip having end walls engaging said opposing side walls of said annular groove, and having an inner diameter at least equal to the diameter of said bore, and having an outer diameter substantially greater than the diameter of said bore; and
- means for contracting and locking said circlip into said circumferential groove to an inner diameter less than said outer diameter of said pipe and an outer diameter greater than said diameter of said bore;
- whereby, said circlip provides a stop member for prohibiting removal of said pipe from said connector when said circlip is in a contracted and locked condition;
- further including a second annular groove in said body encircling said bore at a position along said cylindrical bore at a position remote from said first annular groove; and an O-ring positioned in said second annular groove and engageable with said pipe outer surface in sealing engagement therewith when said pipe is inserted into said bore of said body;

and further comprising;

said inner diameter of said circlip having rotation inhibiting surfaces adapted to provide rotation inhibiting surface contact with said pipe groove when said circlip is in said contracted condition;

and said circlip has a trapezoidal longitudinal cross-section, which is adapted to mate with a complementary trapezoidal longitudinal cross-section on said pipe groove, further including axially extending serrations on the inner diameter of said circlip adapted to mate with complementary axially directed serrations on a bottom wall of said circumferential groove of said pipe, whereby said serrations on the circlip are adapted to interfit with the complementary serrations on the pipe groove in the closed condition of said circlip, and said opposing side walls of said first annular groove and said end walls of said circlip provide a frictional interference fit with one another in the contracted condition of said circlip.

5. The quick connector of claim 4, further including radially extending serrations on said end walls of said circlip adapted to mate with complementary serrations on side walls of said pipe groove in the contracted condition of said circlip to inhibit relative rotation between said pipe and the connector.

6. In a quick connector for a circular pipe of a specific outer diameter having a circumferential groove in an outer surface of said pipe, positioned adjacent an axial end of said pipe and spaced from said axial end, said connector including:

a body having a cylindrical bore, said body having an axial length sufficient to engage said pipe on opposite sides of said circumferential groove of said pipe, said bore having a diameter adapted to slightly exceed that of said outer diameter of said pipe;

a first annular groove having a bottom wall and opposing side walls in said body encircling said bore and communicating directly with said bore at a position adapted to be aligned with said groove of said pipe when said pipe is inserted into said bore of said body;

an abutment within said bore for limiting the extent of axial insertion of said pipe into said bore and for axially aligning said groove in said pipe with said first annular groove in said bore;

a circlip positioned within said first annular groove in said body, said circlip having end walls engaging said opposing side walls of said annular groove, and having an inner diameter at least equal to the diameter of said bore, and having an outer diameter substantially greater than the diameter of said bore; and means for contracting and locking said circlip into said circumferential groove to an inner diameter less than said outer diameter of said pipe and an outer diameter greater than said diameter of said bore;

whereby, said circlip provides a stop member for prohibiting removal of said pipe from said connector when said circlip is in a contracted and locked condition;

further including a second annular groove in said body encircling said bore at a position along said cylindrical bore at a position remote from said first annular groove; and an O-ring positioned in said second annular groove and engageable with said pipe outer surface in sealing engagement therewith when said pipe is inserted into said bore of said body;

and further comprising;

said inner diameter of said circlip having rotation inhibiting surfaces adapted to provide rotation inhibiting surface contact with said pipe groove when said circlip is in said contracted condition;

and said rotation inhibiting surfaces comprising projections on said inner diameter of said circlip and adapted to mate with corresponding recesses provided on a bottom wall of said pipe groove, said projections being adapted to interfit within said recesses in the contracted condition of said circlip, whereby to inhibit relative rotational movement between said pipe and said connector.

7. In a quick connector for a circular pipe of a specific outer diameter having a circumferential groove in an outer surface of said pipe, positioned adjacent an axial end of said pipe and spaced from said axial end, said connector including:

a body having a cylindrical bore, said body having an axial length sufficient to engage said pipe on opposite sides of said circumferential groove of said pipe, said bore having a diameter adapted to slightly exceed that of said outer diameter of said pipe;

a first annular groove having a bottom wall and opposing side walls in said body encircling said bore and communicating directly with said bore at a position adapted to be aligned with said groove of said pipe when said pipe is inserted into said bore of said body;

an abutment within said bore for limiting the extent of axial insertion of said pipe into said bore and for axially aligning said groove in said pipe with said first annular groove in said bore;

a circlip positioned within said first annular groove in said body, said circlip having end walls engaging said opposing side walls of said annular groove, and having an inner diameter at least equal to the diameter of said bore, and having an outer diameter substantially greater than the diameter of said bore; and means for contracting and locking said circlip into said circumferential groove to an inner diameter less than said outer diameter of said pipe and an outer diameter greater than said diameter of said bore;

whereby, said circlip provides a stop member for prohibiting removal of said pipe from said connector when said circlip is in a contracted and locked condition;

further including a second annular groove in said body encircling said bore at a position along said cylindrical bore at a position remote from said first annular groove; and an O-ring positioned in said second annular groove and engageable with said pipe outer surface in sealing engagement therewith when said pipe is inserted into said bore of said body;

and further comprising;

said inner diameter of said circlip having rotation inhibiting surfaces adapted to provide rotation inhibiting surface contact with said pipe groove when said circlip is in said contracted condition;

and said inner diameter of said circlip having a regular polygon radial cross-section engageable in face to face relation with a bottom wall of said pipe groove having a complementary regular polygon radial cross-section, in order to inhibit rotation between said pipe and said connector upon contraction of said circlip.

* * * * *